United States Patent
Avellan et al.

(10) Patent No.: US 8,387,389 B2
(45) Date of Patent: Mar. 5, 2013

(54) GAS TURBINE ENGINE

(75) Inventors: Richard Avellan, Göteborg (SE); Tomas Grönstedt, Göteborg (SE)

(73) Assignee: Volvo Aero Corporation, Trollhättan (SE)

(*) Notice: Subject to any disclaimer, the term of this patent is extended or adjusted under 35 U.S.C. 154(b) by 242 days.

(21) Appl. No.: 12/809,608

(22) PCT Filed: Dec. 20, 2007

(86) PCT No.: PCT/SE2007/001142
§ 371 (c)(1),
(2), (4) Date: Sep. 14, 2010

(87) PCT Pub. No.: WO2009/082275
PCT Pub. Date: Jul. 2, 2009

(65) Prior Publication Data
US 2011/0023446 A1 Feb. 3, 2011

(51) Int. Cl.
*F02C 1/00* (2006.01)
(52) U.S. Cl. .............................. 60/723; 60/262
(58) Field of Classification Search ............. 60/226.1, 60/262, 723, 774, 777, 791
See application file for complete search history.

(56) References Cited

U.S. PATENT DOCUMENTS

| | | | | |
|---|---|---|---|---|
| 2,621,475 A * | 12/1952 | Loy | | 60/774 |
| 2,624,172 A * | 1/1953 | Houdry | | 60/774 |
| 2,672,726 A * | 3/1954 | Wolf et al. | | 60/225 |
| 4,754,607 A * | 7/1988 | Mackay | | 60/723 |
| 6,003,297 A * | 12/1999 | Ziegner | | 60/776 |
| 6,141,953 A * | 11/2000 | Mongia et al. | | 60/774 |
| 6,189,310 B1 | 2/2001 | Kalitventzeff et al. | | |
| 6,205,768 B1 | 3/2001 | Dibble et al. | | |
| 6,313,544 B1 * | 11/2001 | Mongia et al. | | 290/52 |
| 2005/0022499 A1 | 2/2005 | Belokon et al. | | |

FOREIGN PATENT DOCUMENTS

WO 2007128280 A1 11/2007

OTHER PUBLICATIONS

International Search Report for corresponding international Application PCT/SE2007/001142.

* cited by examiner

Primary Examiner — Phutthiwat Wongwian
(74) Attorney, Agent, or Firm — WRB-IP LLP

(57) ABSTRACT

A gas turbine engine includes a first flow passage and a main combustion arrangement in the first flow passage. The engine further includes a second flow passage and a first catalytic combustion arrangement in the second flow passage, wherein the second flow passage can communicate with the first flow passage at at least one upstream passage junction upstream of the main combustion arrangement and upstream of the first catalytic combustion arrangement, and the second flow passage can communicate with the first flow passage at at least one downstream passage junction downstream of the main combustion arrangement and downstream of the first catalytic combustion arrangement.

10 Claims, 5 Drawing Sheets

GAS TURBINE ENGINE

BACKGROUND AND SUMMARY

The present invention relates to a gas turbine engine, principally for airplane propulsion purposes.

In the field of airplane engines, with increasing concerns over environmental pollution issues, large efforts are invested in finding solutions to decrease emissions from such engines.

Regarding stationary gas turbines, e.g. for power generation, a number of solutions have been provided for reducing emissions, including providing catalytic converters between different stages of the turbine, see for example U.S. Pat. No. 618,931 B1.

However, at full thrust operations in airplane propulsion applications, the solution of providing catalytic converters between different stages of the turbine could result in the maximum required cycle temperature damaging the catalytic converters. Such a solution would also introduce pressure losses in the flow between the turbines. Further, for airplane propulsion applications, such a solution would result in engine lengths that might be un-practical.

It is desirable to reduce emissions from a gas turbine engine.

It is desirable to reduce emissions from a gas turbine engine for airplane propulsion.

It is desirable to reduce NOx emissions from a gas turbine engine.

It is desirable to reduce emissions from a gas turbine engine for airplane propulsion, without reducing the thrust of the engine.

It is to reduce emissions from a gas turbine engine for airplane propulsion, without reducing the overall efficiency of the engine.

According to an aspect of the present invention, a gas turbine engine is provided comprising a first flow passage, and main combustion means in the first flow passage, characterized in that it comprises a second flow passage, and first catalytic combustion means in the second flow passage, wherein the second flow passage can communicate with the first flow passage at at least one upstream passage junction upstream of the main combustion means and upstream of the first catalytic combustion means, and the second flow passage can communicate with the first flow passage at at least one downstream passage junction downstream of the main combustion means and downstream of the first catalytic combustion means.

Thus, the first and second flow passages can be arranged as parallel flow passages extending from the upstream passage junction to the downstream passage junction. As understood in the art, air compressing means can be located upstream of the main combustion means, and a turbine assembly can be located downstream of the main combustion means and adapted to drive the air compressing means via at least one central shaft. The main combustion means can be adapted for traditional flame combustion, or, as described further below, it can comprise second catalytic combustion means.

The invention provides for the main combustion means being used for high thrust requirements, such as in take-off conditions in airplane propulsion applications. During the take-off of an airplane, the thrust requirements are larger than during cruise and descent. During operations requiring less thrust, the main combustion means can be allowed to work with reduced or shut-off fuel supply, whereby air is guided through the second flow passage. Thereby, the first catalytic combustion means can be used for oxidizing, as exemplified below, fuel for providing thrust, and thereby replace the main combustion means in such operations with lower thrust requirements. As explained closer below, since reactions occurring in catalytic combustion can take place at a temperature which is considerably lower than the temperature at which corresponding reactions take place in conventional flame combustion, it is possible, during use of the first catalytic combustion means, to considerably reduce emissions, specially the production of thermal nitrogen oxides (NOx). Thus, the main combustion means can provide at least the majority of the combustion process during the start phase of an airplane, and the first catalytic combustion means can provide at least the majority of the combustion process when thrust requirements are lower, such as during airplane cruise and descent.

Preferably, upstream flow control means are provided at the at least one upstream passage junction to control the communication between the first and second flow passages. Thereby, gas flow from the first flow passage to the second flow passage can be controlled. Also, preferably downstream flow control means are provided at the at least one downstream passage junction to control the communication between the first and second flow passages. Thereby, gas flow from the second flow passage to the first flow passage can be controlled.

Preferably, where air compressing means are provided in the first flow passage, upstream of the main combustion means, at least one of the at least one upstream passage junction is located downstream of at least a portion of the air compressing means. Thereby, upstream flow control means can be adapted to control communication at the at least one of the at least one upstream passage junction. As explained further below, in airplane propulsion applications, said upstream flow control means can be provided as bleed valves arranged to control the provision of compressed air to the first catalytic combustion means. Thereby, the first catalytic combustion means can participate in thrust generation during airplane start, take-off and climb. Also, in addition to the air being compressed for the combustion in the first catalytic combustion means, the air is heated, so as for it to quickly reach a temperature corresponding to the activation temperature of the first catalytic combustion means.

In some embodiments, where air compressing means are provided in the first flow passage, upstream of the main combustion means, and at least one of the at least one upstream passage junction is located downstream of at least a portion of the air compressing means, fuel injection means are arranged to provide fuel into the first flow passage upstream of the at least one of the at least one upstream passage junction. Thereby, it is possible to evaporate the fuel in the compressor so as to decrease the temperature of the compressed air.

In certain embodiments, for example in the one described below with reference to FIG. 7, where the air compressing means comprises a low pressure compressor and a high pressure compressor, at least one of the at least one upstream passage junction can be located downstream of the low pressure compressor and upstream of the high pressure compressor.

Preferably, where the engine is provided with air compressing means in the first flow passage, upstream of the main combustion means, at least one of the at least one upstream passage junction is located downstream of the air compressing means. Also, where the engine is provided with a turbine assembly in the first flow passage, downstream of the main combustion means, at least one of the at least one downstream passage junction is located upstream of the turbine assembly. Thereby, for example during cruise and descent in airplane propulsion applications, by controlling the gas to flow mainly through such an upstream passage junction located downstream of the air compressing means, and through such downstream passage junction is located upstream of the turbine assembly, essentially all air will be conducted through the second flow passage. Thereby, essentially all combustion will take place in the first catalytic combustion means, providing, as explained closer below, significantly reduced emission levels compared to traditional combustion.

Preferably, at least one of the at least one downstream passage junction is located downstream of at least a part of the turbine assembly. Preferably, where the turbine assembly comprises a high pressure turbine and a low pressure turbine, the at least one of the at least one downstream passage junction is located downstream of the high pressure turbine and upstream of the low pressure turbine. Thereby, where the low pressure turbine is linked to drive a low pressure compressor of the engine, the low pressure turbine can be driven by the first catalytic combustion means and in turn drive the low pressure compressor. As explained closer below, this provides an effective arrangement at the turbine during the participation of the first catalytic combustion means in thrust generation during airplane start, take-off and climb.

With said embodiment where the at least one of the at least one downstream passage junction is located downstream of the high pressure turbine and upstream of the low pressure turbine, it is possible to provide an inter-turbine combustion with the first catalytic combustion means. Compared to known gas turbine engines, this will increase the specific thrust of the engine for airplane propulsion. In other words, this will increase power efficiency, which in turn makes it possible to decrease the weight and size of the engine in view of a given thrust requirement. For airplane propulsion purposes, the decreased weight and size will decrease the weight and drag of the airplane configuration; in other words, it will give a more effective airplane/engine configuration.

In a special embodiment, exemplified below with reference to FIG. 6, the main combustion means comprises second catalytic combustion means.

DESCRIPTION OF THE FIGURES

Below, the invention will be described in detail with reference to the drawing, in which.

DETAILED DESCRIPTION

Figure 1:
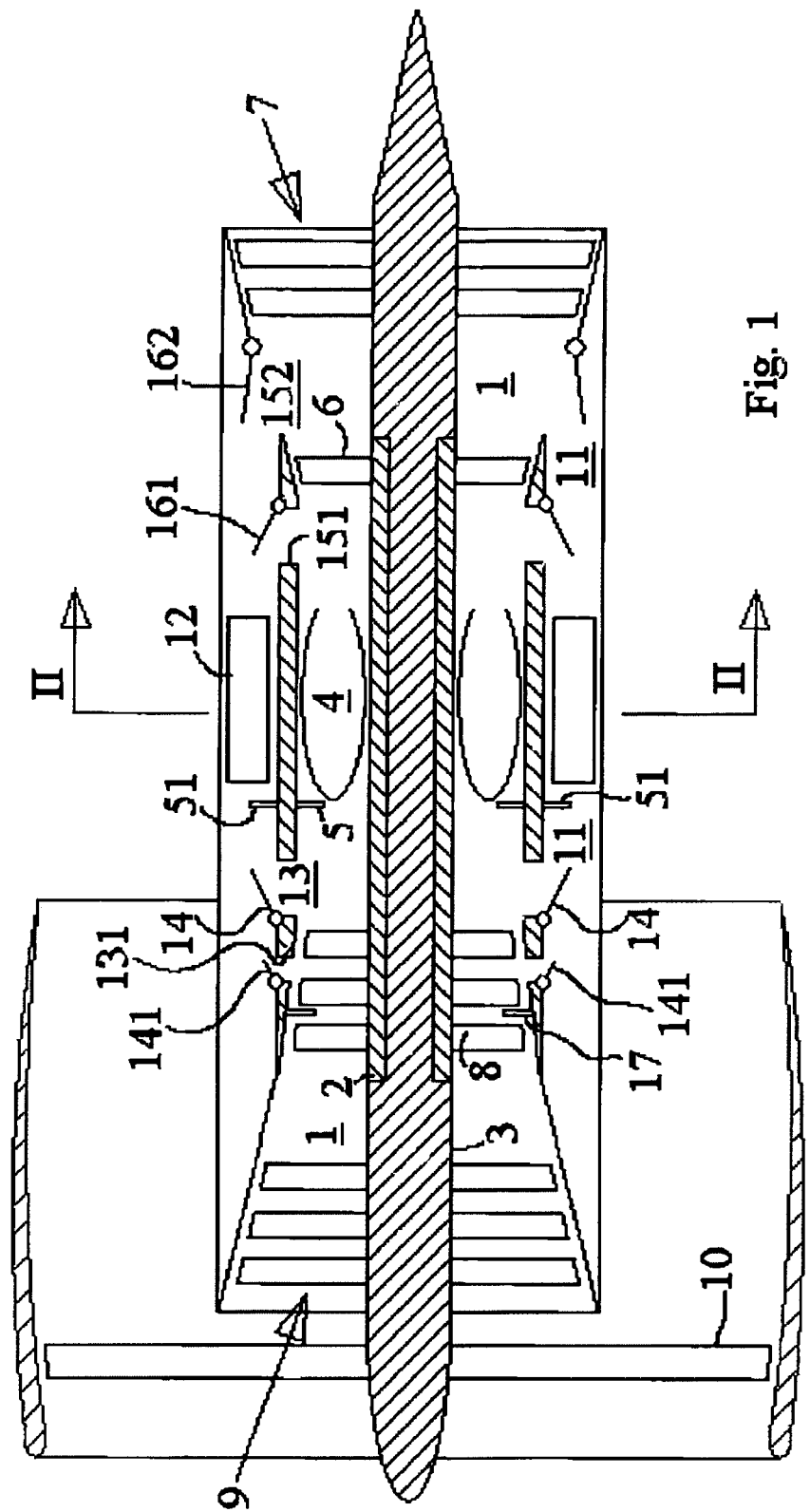
FIG. 1 shows a schematic longitudinal cross-section of a gas turbine engine.

FIG. 1 shows a schematic longitudinal cross-section of a gas turbine engine in the form of a turbofan engine for airplane propulsion comprising a first flow passage 1 extending essentially in a longitudinal direction of the engine, and concentrically with a central assembly including a first and a second shaft 2, 3. During operation, gas flow through the engine takes place from the left to the right in FIG. 1. Main combustion means 4, comprising a combustion chamber 4 with a plurality of burners fed by a plurality of fuel injection devices 5 for flame combustion, are provided in the first flow passage 1.

In the first flow passage 1, downstream of the combustion chamber 4, a rotatable turbine assembly 6, 7 is provided, comprising an axial high pressure turbine 6, and downstream thereof an axial low pressure turbine 7. Preferably, an arrangement, in itself known in the art, is provided for a variable geometry of the low pressure turbine 7.

Also in the first flow passage 1, upstream of the combustion chamber 4, rotatable air compressing means 8, 9 are provided, comprising an axial high pressure compressor 8, and upstream thereof an axial low pressure compressor 9. The axial high pressure compressor 8 is adapted to be driven by the axial high pressure turbine 6 by means of the first shaft 2. Preferably, the high pressure compressor 8 is arranged with a variable compressor geometry, in itself known in the art. The axial low pressure compressor 9 is adapted to be driven by the axial low pressure turbine 7 by means of the second shaft 3. Upstream of the axial low pressure compressor 9 a fan 10 is provided.

Figure 2:
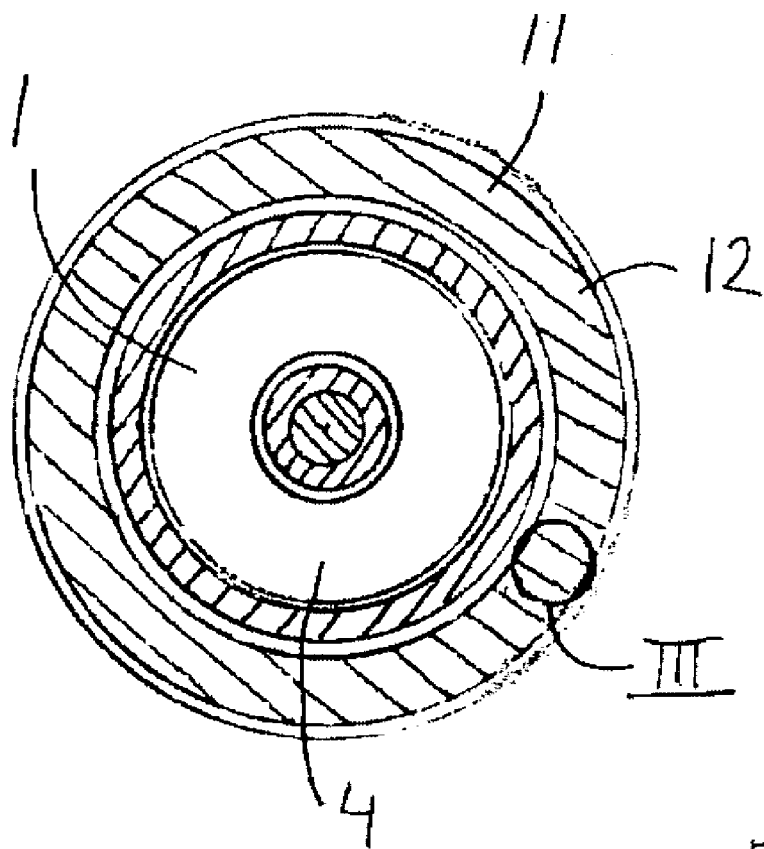
FIG. 2 shows a schematic cross-section of the gas turbine engine, sectioned along the line II-II in FIG. 1.

Reference is made to FIG. 1 and FIG. 2. A second flow passage 11 is provided radially outside the first flow passage 1. The second flow passage 11 extends essentially in a longitudinal direction of the engine, and concentrically the first flow passage 1. Thus, the second flow passage 11 is arranged in parallel with the first flow passage 1. First catalytic combustion means 12, described closer below, are provided in the second flow passage 12. A plurality of additional fuel injection devices 51 are provided in the second flow passage 11 for feeding the first catalytic combustion means 12.

In this embodiment, two upstream passage junctions 13, 131 are provided, at which the second flow passage 11 can communicate with the first flow passage 1 upstream of the combustion chamber 4 and the first catalytic combustion means 12. At one of the upstream passage junctions 13, said communication is controllable by upstream flow control means 14 in the form of a plurality of upstream valve flaps 14 distributed circumferentially around the first flow passage 1. More specifically, the upstream valve flaps 14 are adapted control gas flow from the first flow passage 1 to the second flow passage 11 upstream of the combustion chamber 4 and downstream of the high pressure compressor 8.

Also, at downstream passage junctions 151, 152, downstream of the combustion chamber 4 and the first catalytic combustion means 12, the second flow passage 11 can communicate with the first flow passage 1, which communication is controllable by downstream flow control means 161, 162. More specifically, the downstream flow control means 161, 162 are adapted control gas flow from the second flow passage 11 to the first flow passage 1. The downstream flow control means 161, 162 comprise a plurality of valve flaps distributed circumferentially around the first flow passage 1.

The downstream passage junctions 151, 152 comprise a first downstream passage junction 151 located upstream of the turbine assembly 6, 7, more specifically, between the combustion chamber 4 and the high pressure turbine 6. The downstream passage junctions 151, 152 further comprise a second downstream passage junction 152 located downstream of a part of the turbine assembly 6, 7, more specifically, between the high pressure turbine 6 and the low pressure turbine 7. The downstream flow control means 161, 162 comprise first downstream flow control means 161 adapted to control communication through the first downstream passage junction 151, and second downstream flow control means 162 adapted to control communication through the second downstream passage junction 152.

In the first flow passage 1, fuel injection means 17 are arranged to introduce fuel at stators (not shown) of the high pressure compressor 8. In operation, due to the elevated air temperature in the high pressure compressor 8, the fuel injected by the fuel injection means 17 into the high pressure compressor 8 will be evaporated. This will have a cooling effect on the compressed air, which can increase the performance during operation with the main combustion means 4.

Between the first upstream valve flaps 14 and the first catalytic combustion means 12, at the other upstream passage junction 131, upstream flow control means comprising a plurality of bleed valves 141 are arranged to provide fuel into the second flow passage 11. The bleed valves 141 are distributed circumferentially outside the high pressure compressor 8. By opening the bleed valves 141, evaporated fuel from the high pressure compressor 8 will be allowed into the second flow passage 11. Thereby, the bleed valves 141 can be used to control the provision of a compressed mixture of air and evaporated fuel to the first catalytic combustion means 12, which therefore can participate in thrust generation during airplane start, take-off and climb. Also, in addition to fuel being provided to the first catalytic combustion means 12, air will be bled from the high pressure compressor 8 to unload it in accordance with the pressure level therein during starting and low power operation so as to extend the operating range of the engine by operating as close to stall region of the high pressure compressor 8 as possible.

Figure 5:
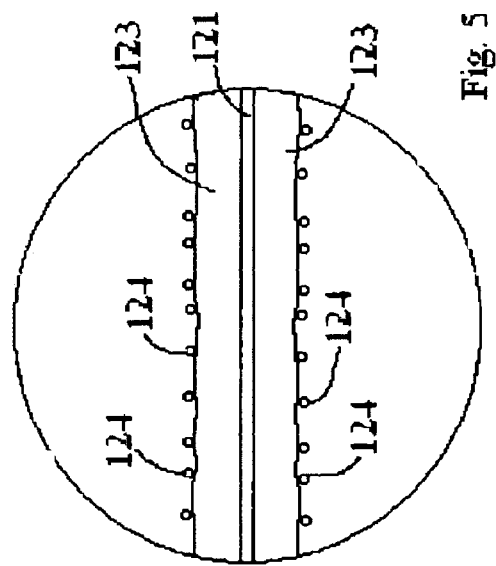
FIG. 5 shows an enlarged view as indicated with the circle V in FIG. 4.
Figure 3:
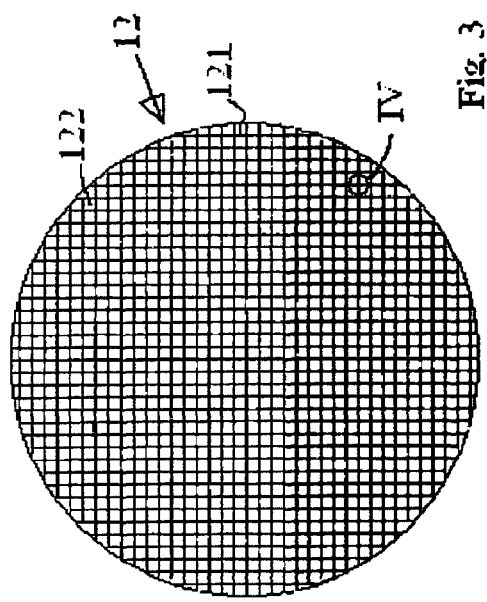
FIG. 3 shows an enlarged view of a part of the engine as indicated with the circle III in FIG. 2.
Figure 4:
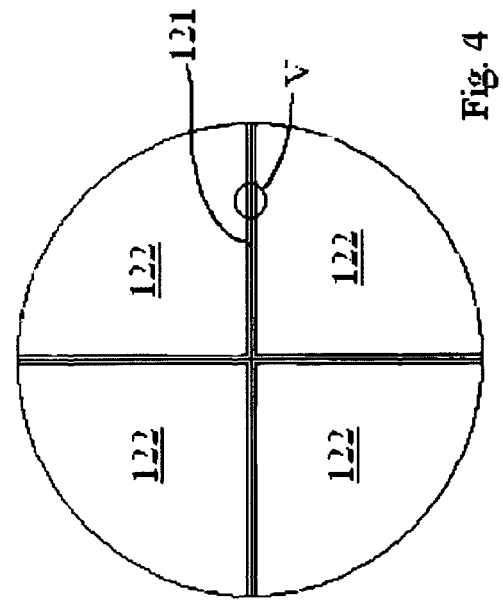
FIG. 4 shows an enlarged view as indicated with the circle IV in FIG. 3.

Reference is made to FIG. 3-FIG. 5 showing successively enlarged views of the first catalytic combustion means 12. The first catalytic combustion means comprises a support structure 121 forming a plurality of parallel channels 122, in this example with rectangular cross-sections, each channel extending in the direction of the second flow passage 11. Alternatively, the channels 122 could present another cross-sectional shape, for example hexagonal. The support structure 121 provides a large surface area exposure to the fluid flowing through the first catalytic combustion means 12. As can be seen in FIG. 5, the support structure 121, carries a washcoat 123, which in turn carries an active phase 124 on its surface, which makes the catalytic reactions possible.

The support structure 121 could be made of a ceramic material or a metal, and preferably it presents a low thermal expansion, a high thermal shock resistance, and a high melting point. Also, the walls of the support structure 121 are preferably thin to minimize the pressure drop through the second flow passage 11. The washcoat 123 is porous so as to further increase the surface area within the first catalytic combustion means 12, and could be made in for example alumina, zirconia, or silica.

The material of the active phase 124 is chosen based on factors such as the type of fuel used, and the temperature range of the first catalytic combustion means 12, and could be for example a platinum group metal or a metal-oxide.

Both in the main combustion means 4 and in the first catalytic combustion means 12 hydrocarbons can be combusted to release chemical energy to increase temperature for generating thrust. In the first catalytic combustion means 12 this is provided for by the active phase 124. Thus, as outlined below, the first catalytic combustion means 12 can provide combustion of an air/fuel mixture and partially or completely replace the main combustion means 4 in the engine process for generating thrust.

The air/fuel ratio for engine combustion is often expressed as a value of lambda, φ, which is defined as the stoichiometric air/fuel ratio divided by the actual air/fuel ratio. Thus, for a stoichiometric air/fuel ratio, φ=1. In both the main combustion means 4 and in the first catalytic combustion means 12, the combustion of hydrocarbons can be described in a simplified way as follows:

For stoichiometric and lean conditions (φ≦1):

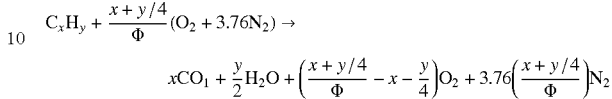

For stoichiometric and rich conditions (φ≧1):

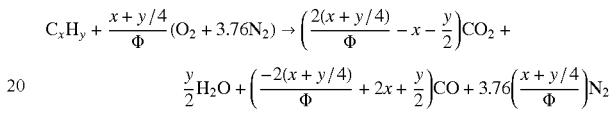

It should be noted that in order for these reactions to effectively take place in the first catalytic combustion means 12, they have to reach a minimum temperature known as activation temperature.

A main advantage with the first catalytic combustion means 12 is that combustion takes place under considerably lower temperature than that of traditional combustion. Thereby, formation of thermal nitrogen oxides, NOx, can be avoided. Such thermal NOx formation, presenting a big problem in emission control in traditional gas turbine engines, takes place at high temperatures, typically above 1800 K, and can be described with the following reactions (Zeldovich mechanism):

O2→2O

N2+O→NO+N

N+O2→NO+O

N+OH→NO+H

The engine is preferably used as follows. During start, take-off and climb phases of the airplane, the bleed valves 141 and the second downstream flow control means 162 are open. Also during the start, take-off and climb phases, the upstream valve flaps 14 and the first downstream flow control means 161 are closed. Thereby, during the start, take-off and climb phases combustion will take place in both the main combustion means 4 and in the first catalytic combustion means 12.

During cruise of the airplane, the bleed valves 141 and the second downstream flow control means 162 are closed. Also during cruise, the upstream valve flaps 14 and the first downstream flow control means 161 are open. Thereby, during cruise essentially all air will be conducted through the second flow passage 11 and essentially all combustion will take place in the first catalytic combustion means 12, at which the hot combustion gases, which have very low emission levels, will be conducted through the first downstream flow control means 161 located upstream of the high pressure turbine 6.

During the cruise phase, the fuel injection devices 5 at the main combustion means 4 can be controlled so as to inject a reduced flow of fuel, in order for the main combustion means 4 to operate in an idle mode, while the major part of the thrust is provided by the first catalytic combustion means 12. This mode can be sustained throughout the cruise and descent stages of the airplane.

Figure 6:
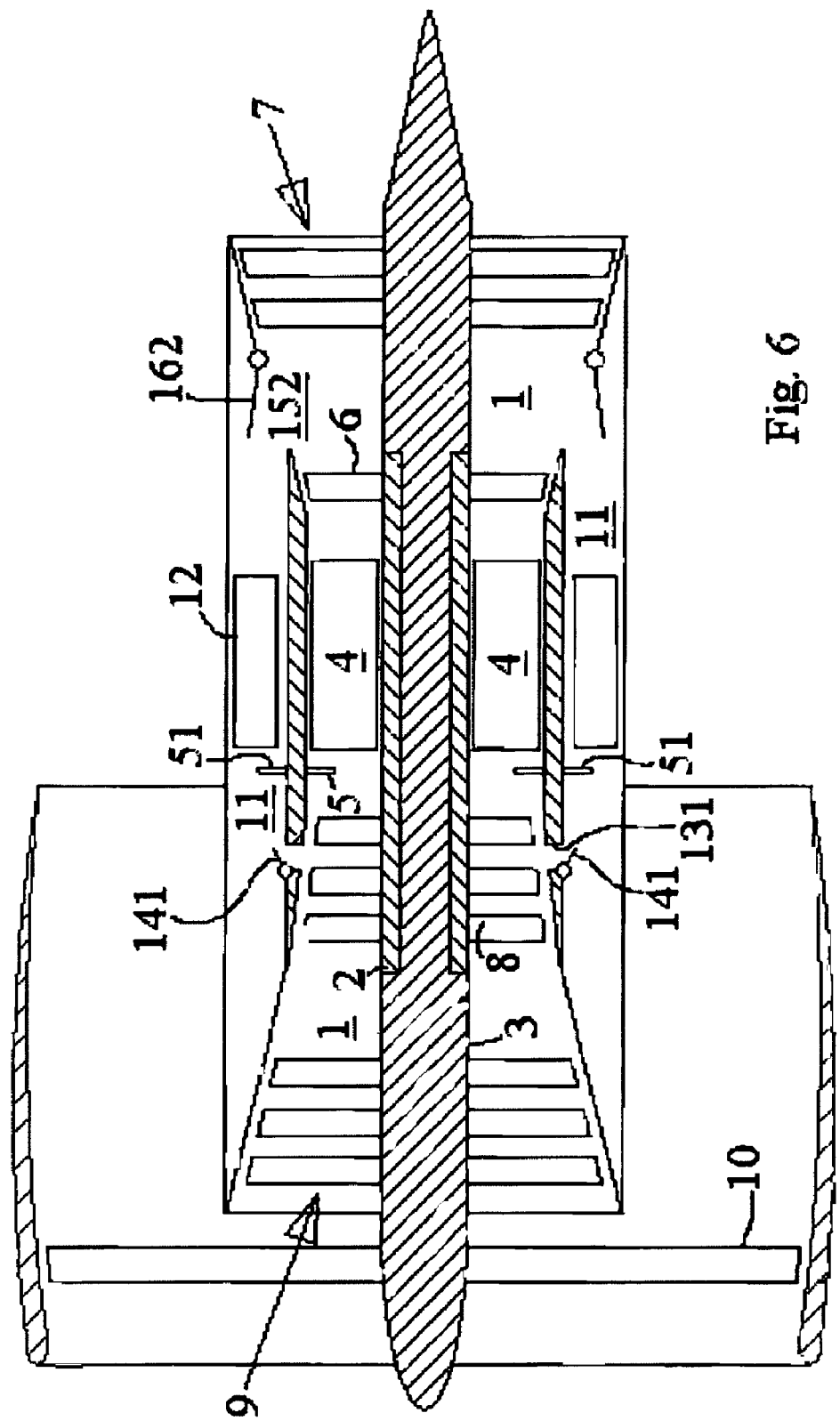
FIG. 6 shows a schematic longitudinal cross-section of a gas turbine engine according to an alternative embodiment of the invention.

FIG. 6 shows a gas turbine engine according to an alternative embodiment of the invention, which is similar to the embodiment described above, apart from the following exceptions. The main combustion means 4 is provided as second catalytic combustion means 4, arranged similarly to the first catalytic combustion means 12 described above with reference to FIG. 3-FIG. 5. Also, differing from the embodiment described above, there are no upstream valve flaps 14 downstream of the high pressure compressor 8, and there are no first downstream flow control means 161 upstream of the high pressure turbine. Further, there are no fuel injection means 17 arranged to introduce fuel at the high pressure compressor 8. In operation of the engine in FIG. 6, the bleed valves 141 and the second downstream flow control means 162 can remain open during all flight phases. Thereby, all combustion in the engine is catalytic combustion, resulting in a very low emission operation in all flight modes.

Figure 7:
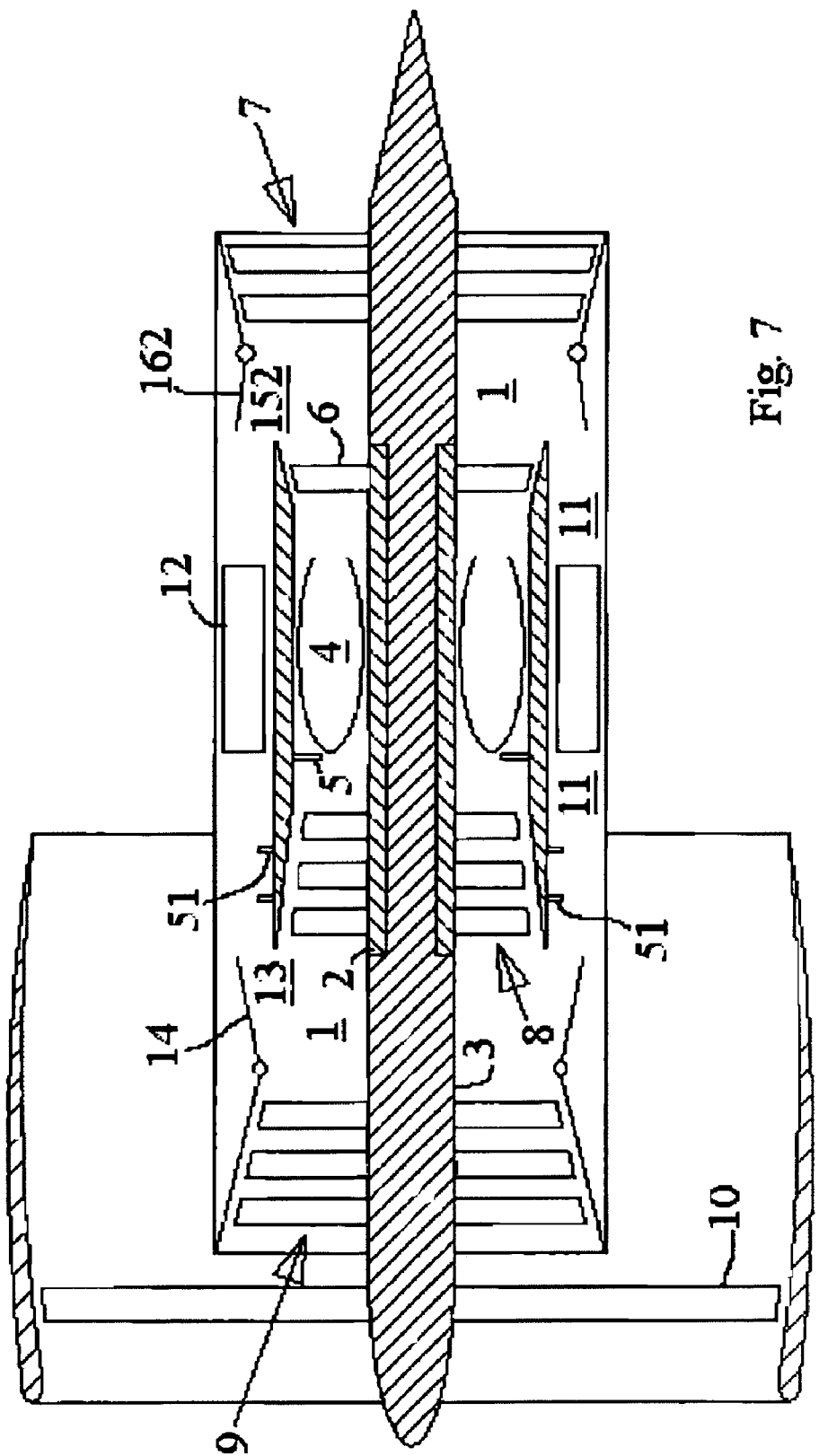
FIG. 7 shows a schematic longitudinal cross-section of a gas turbine engine according to a further alternative of the invention.

FIG. 7 shows a gas turbine engine according to a further alternative of the invention, which is similar to the embodiment described above with reference to FIGS. 1 and 2, apart from the following exceptions. An upstream passage junction 13 is located downstream of a part of the air compressing means 8, 9, more specifically, between the low pressure compressor 9 and the high pressure compressor 8. Further, there is no first downstream passage junction 151. Similarly to the embodiments described above, in the embodiment in FIG. 7, fuel injection devices 51 are arranged in the second flow passage 11, between the upstream passage junction 13 and the first catalytic combustion means 12, to provide fuel into the second flow passage 11.

It should be noted that the invention is applicable to a large number of gas turbine engine types in addition to the turbofan engines described above. Such alternative engine types could be low bypass ratio turbojet engines, engines with radial compressors, and/or engines with diagonal or mixed flow compressors.

The invention claimed is:

1. A gas turbine engine comprising
a first flow passage,
a main combustion chamber in the first flow passage,
a turbine assembly in the first flow passage, downstream of the main combustion chamber,
a second flow passage, and
a first catalytic combustion device in the second flow passage,
wherein the second flow passage communicates with the first flow passage at at least one upstream passage junction upstream of the main combustion chamber and upstream of the first catalytic combustion device, and the second flow passage communicates with the first flow passage at at least one downstream passage junction downstream of the main combustion chamber and downstream of the first catalytic combustion device, and at least one of the at least one downstream passage junctions is located upstream of the turbine assembly.

2. A gas turbine engine according to claim 1, wherein an upstream valve is provided at the at least one upstream passage junction to control the communication between the first and second flow passages.

3. A gas turbine engine according to claim 1, wherein a compressor is provided in the first flow passage, upstream of the main combustion chamber.

4. A gas turbine engine according to claim 3, wherein at least one of the at least one upstream passage junction is located downstream of at least a portion of the compressor.

5. A gas turbine engine according to claim 4, wherein an upstream valve is adapted to control communication at the at least one of the at least one upstream passage junction.

6. A gas turbine engine according to claim 3, wherein at least one of the at least one upstream passage junction is located downstream of the compressor.

7. A gas turbine engine according to claim 1, wherein a turbine assembly is provided in the first flow passage, downstream of the main combustion chamber, and at least one of the at least one downstream passage junction is located downstream of at least a part of the turbine assembly.

8. A gas turbine engine according to claim 7, wherein the turbine assembly comprises a high pressure turbine and a low pressure turbine, the at least one of the at least one downstream passage junction being located downstream of the high pressure turbine and upstream of the low pressure turbine.

9. A gas turbine engine according, to claim 1, wherein the main combustion chamber comprises a second catalytic combustion device.

10. A gas turbine engine comprising
a first flow passage,
a main combustion chamber in the first flow passage,
a second flow passage, and
a first catalytic combustion device in the second flow passage,
wherein the second flow passage communicates with the first flow passage at at least one catalytic combustion device and the second flow passage communicates with the first flow passage at at least one downstream passage junction downstream of the main combustion chamber and downstream of the first catalytic combustion device, and wherein a downstream valve is provided at the at least one downstream passage junction to control the communication between the first and second flow passages.

* * * * *